United States Patent [19]

Schlatzer

[11] 3,957,697

[45] May 18, 1976

[54] PROCESS FOR SLURRY POLYMERIZATION OF PROPYLENE OXIDE WITH HIGH CATALYST EFFICIENCY

[75] Inventor: Robert K. Schlatzer, Chagrin Falls, Ohio

[73] Assignee: The B. F. Goodrich Company, Akron, Ohio

[22] Filed: Oct. 24, 1974

[21] Appl. No.: 517,457

[52] U.S. Cl. .................................. 260/2 A; 526/69; 526/70; 526/208; 526/237; 526/266; 526/320
[51] Int. Cl.$^2$ ................... C08G 65/08; C08G 65/10; C08G 65/30
[58] Field of Search ......................... 260/2 A, 80 M

[56] References Cited
UNITED STATES PATENTS

| | | | |
|---|---|---|---|
| 2,482,056 | 9/1949 | Elwell et al. | 260/80 M |
| 3,135,705 | 6/1964 | Vandenberg | 260/2 A |
| 3,275,573 | 9/1966 | Vandenberg | 260/2 A |
| 3,280,045 | 10/1966 | Vandenberg | 260/2 A |
| 3,285,861 | 11/1966 | Vandenberg | 260/2 A |
| 3,642,667 | 2/1972 | Steller | 260/2 A |

FOREIGN PATENTS OR APPLICATIONS

| | | | |
|---|---|---|---|
| 240,158 | 12/1959 | Australia | 260/2 A |

OTHER PUBLICATIONS

Condensed Chemical Dictionary, 5th Edition, Reinhold, N.Y. (1956), p. 989.

*Primary Examiner*—H. S. Cockeram
*Attorney, Agent, or Firm*—J. Hughes Powell, Jr.; E. K. Bean

[57] ABSTRACT

A propylene oxide slurry polymerization process having high catalyst efficiency comprises (A) homopolymerizing or copolymerizing propylene oxide in isobutane in the presence of a catalyst substantially soluble in isobutane, (B) separating isobutane with catalyst dissolved therein from propylene oxide polymer, and (C) recycling isobutane and dissolved catalyst for further polymerization. The catalyst comprises (1) at least one trialkylaluminum compound wherein each alkyl group contains from 2 to 10 carbon atoms, (2) at least one diketone containing from 5 to 20 carbon atoms and (3) water. The catalyst may also contain (4) at least one dialkyl ether or cycloalkyl ether containing from 2 to 12 carbon atoms and/or (5) at least one ether alcohol containing from 2 to 12 carbon atoms.

12 Claims, No Drawings

PROCESS FOR SLURRY POLYMERIZATION OF PROPYLENE OXIDE WITH HIGH CATALYST EFFICIENCY

BACKGROUND OF THE INVENTION

It is known to polymerize epoxides at temperatures from about −80°C. to about 250°C. using as catalysts trialkylaluminum compounds complexed with tetrahydrofuran and then reacted with a diketone and water. U.S. Pat. No. 3,642,667 teaches that partial replacement of the diketone with an ether alcohol markedly enhances catalyst activity and life. U.S. Pat. No. 3,135,705 teaches as an epoxide catalyst any organoaluminum compound reacted with water and a chelator such as tetrahydrofuran, a diketone, a hydroxy ester, or the like, but mixtures of the chelators are neither disclosed nor suggested. German Disclosure Document 2,218,243 teaches slurry polymerization of propylene oxide in 4-carbon aliphatic hydrocarbons or in mixtures of 4-carbon aliphatic hydrocarbons with other solvents. The German reference teaches a wide variety of ionic catalysts, such as triethylaluminum, and they are not subject to any special restrictions. A new, more efficient process is desired for slurry polymerization of propylene oxide.

SUMMARY OF THE INVENTION

A propylene oxide slurry polymerization process having high catalyst efficiency comprises (A) homopolymerizing or copolymerizing propylene oxide in isobutane in the presence of a catalyst substantially soluble in isobutane, (B) separating isobutane with catalyst dissolved therein from propylene oxide polymer, and (C) recycling isobutane and dissolved catalyst for further polymerization. The catalyst comprises (1) at least one trialkylaluminum compound wherein each alkyl group contains from 2 to 10 carbon atoms, (2) at least one diketone containing from 5 to 20 carbon atoms and (3) water. The catalyst may also contain (4) at least one dialkyl ether or cycloalkyl ether containing from 2 to 12 carbon atoms and/or (5) at least one ether alcohol containing from 2 to 12 carbon atoms.

DETAILED DESCRIPTION

Propylene oxide homopolymers and copolymers prepared by the novel recycling process of this invention are known in the art. Propylene oxide may be copolymerized with up to about 40% by weight, more preferably by up to about 25% by weight and even more preferably up to about 15% by weight of the total monomer mixture of at least one other oxirane monomer. Suitable oxirane comonomers include (a) glycidyl ethers and haloalkyl glycidyl ethers such as methyl glycidyl ether, ethyl glycidyl ether, methylethyl glycidyl ether, butyl glycidyl ether, n-hexyl glycidyl ether, phenyl glycidyl ether, allyl glycidyl ether, 2,2-bis(chloromethyl)ethyl glycidyl ether, 2-chloroethyl glycidyl ether, 2-bromoethyl glycidyl ether, 2-chloro-1-methylethyl glycidyl ether, 2,2,2-tris(chloromethyl)ethyl glycidyl ether and the like; (b) alkylene oxides and cycloalkylene oxides such as ethylene oxide, cis- and trans- but preferably cis-butene-2-oxide, butene-1 epoxide, cis- and trans- pentene-2-oxide, cis- and trans-hexene-2-oxide, cis- and trans-hexene-3-oxide, cyclohexene oxide, and the like; (c) haloalkylene oxides such as an epihalohydrin selected from the group consisting of epichlorohydrin, epibromohydrin, epifluorohydrin and epiiodohydrin; (d) other haloalkylene oxides such as 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4-epoxybutane, 1,1,1-trifluoro-2,3-epoxypropane, 1,1-bis(chloromethyl)ethylene oxide, 3-chloro-2-methyl-1,2-epoxypropane, cis- and trans-1,4-dichloro-2,3-epoxybutane, and the like; (e) glycidyl acrylate and glycidyl methacrylate; and (f) phenyl alkylene oxides such as styrene oxide and the like.

More preferred oxirane comonomers are (a) glycidyl ethers and haloalkyl glycidyl ethers containing from 4 to 15 carbon atoms, more preferably from 4 to 10 carbon atoms, such as methyl glycidyl ether, ethyl glycidyl ether, methylethyl glycidyl ether, butyl glycidyl ether, n-hexyl glycidyl ether, phenyl glycidyl ether, allyl glycidyl ether, 2,2-bis(chloromethyl)ethyl glycidyl ether, 2-chloroethyl glycidyl ether, 2-bromoethyl glycidyl ether, 2-chloro-1-methylethyl glycidyl ether, 2,2,2-tris(chloromethyl)ethyl glycidyl ether, and the like; (b) alkylene oxides and cycloalkylene oxides containing from 2 to 8 carbon atoms, more preferably from 4 to 8 carbon atoms, such as ethylene oxide, cis- and trans- but preferably cis-butene-2-oxide, butene-1 epoxide, cis- and trans-pentene-2-oxide, cis- and trans-hexene-2-oxide, cis- and trans-hexene-3-oxide, cyclohexene oxide, and the like; and (c) an epihalohydrin selected from the group consisting of epichlorohydrin, epibromohydrin, epifluorohydrin and epiiodohydrin. Excellent results may be obtained with allyl glycidyl ether and epichlorohydrin.

The catalyst of this invention comprises (1) at least one trialkylaluminum compound wherein each alkyl group contains from 2 to 10 carbon atoms, (2) at least one diketone containing from 5 to 20 carbon atoms and (3) water. The catalyst may also contain (4) at least one dialkyl ether or cycloalkyl ether containing from 2 to 12 carbon atoms and/or (5) at least one ether alcohol containing from 2 to 12 carbon atoms. The amount of each catalyst component (1) per mole of trialkylaluminum compound may be (2) from about 0.3 mole to about 1 mole of diketone, (3) from about 0.3 mole to about 1 mole water, (4) if used, from about 0.5 mole to about 25 moles dialkyl or cycloalkyl ether, and (5) if used, from about 0.05 mole to about 0.5 mole ether alcohol.

Each alkyl group of trialkylaluminum compounds suitable for use in this invention contains from 2 to 10 carbon atoms, more preferably from 2 to 8 carbon atoms. Suitable trialkylaluminum compounds include triethylaluminum, tripropylaluminum, triisopropylaluminum, triisobutylaluminum, trihexylaluminum, trioctylaluminum and the like. Trihexylaluminum is much preferred, since catalysts made from it are essentially completely soluble i.e., more than 90% soluble by weight, in isobutane. Catalysts made from other trialkylaluminum compounds such as triethylaluminum may contain an isobutane-insoluble portion which remains in the polymer during isobutane-polymer separation and is therefore unsuitable for recycling. In the case of triethylaluminum or trialkylaluminum compounds other than trihexylaluminum this insoluble catalyst portion may vary inversely with diketone content of the catalyst and directly with water content of the catalyst.

Diketones suitable for use in the catalyst of this invention contain from 5 to 20 carbon atoms, more preferably from 5 to 15 carbon atoms. Suitable diketones include acetylacetone, trifluoroacetylacetone, acetonylacetone, benzoylacetone, furoylacetone, dibenzoyl methane, 3-methyl-2,4-pentanedione, 3-benzyl-2,4-pentanedione, and the like. Excellent results were obtained with acetylacetone.

Dialkyl ethers and cycloalkyl ethers suitable for use in this invention contain from 2 to 12 carbon atoms, more preferably from 2 to 8 carbon atoms. Suitable dialkyl ethers and cycloalkyl ethers include dimethyl ether, diethyl ether, dipropyl ether, diisopropyl ether, di-n-butyl ether, tetrahydrofuran, tetrahydropyran and the like. More preferred ethers are diethyl ether and tetrahydrofuran. Excellent results were obtained with diethyl ether.

Ether alcohols suitable for use in this invention contain from 2 to 12 carbon atoms, more preferably from 2 to 8 carbon atoms. Suitable ether alcohols include 2-methoxyethanol, 2-ethoxyethanol, 2-(2-ethoxyethoxy)ethanol, tetrahydrofurfuryl alcohol, tetrahydropyran-2-methanol and tetrahydrofuranpropanol. More preferred ether alcohols include 2-methoxyethanol, tetrahydropyran-2-methanol and tetrahydrofurfuryl alcohol. Tetrahydrofurfuryl alcohol is most preferred.

A preferred catalyst preparation procedure comprises complexing (1) at least one trialkylaluminum compound first with (2) at least one dialkyl ether or cycloalkyl ether, then with (3) water, and thereafter with (4) at least one diketone, and (5) if used, a least one ether alcohol. Aluminum tris(acetylacetonate) or the like may serve as the entire ketone portion of the catalyst, with each mole of aluminum tris(acetylacetonate) contributing three moles of diketone to the catalyst. Aluminum tris(acetylacetonate) may also replace up to one-third the molar amount of trialkylaluminum compound. Another preferred catalyst preparation procedure comprises complexing at least one trialkylaluminum compound first with aluminum tris(acetylacetonate) and thereafter with water.

The catalyst may be prepared in bulk or in an inert diluent, more preferably in an inert diluent. Suitable inert diluents include liquid aromatic hydrocarbons containing from 6 to 14 carbon atoms such as benzene, toluene, o-, m-, and p-xylene, mesitylene and the like; and liquid dialkyl, aryl and cycloalkyl ethers such as diethyl ether, dipropyl ether, diisopropyl ether, tetrahydrofuran, and the like. Excellent results were obtained with diethyl ether and a mixture of diethyl ether and toluene.

Best results are obtained if the catalyst is prepared at a temperature from about −10°C. to about 20°C., more preferably from about −5°C. to about 5°C. The prepared catalyst is preferably aged for a substantial time period to attain maximum efficiency, e.g., from about 2 days to about 30 days at a temperature from about 20°C. to about 40°C., or from about 0.5 hour to about 15 hours at a temperature from about 50°C. to about 100°C. Although catalyst aging is desirable, excellent results may be obtained by using the catalyst immediately. The catalyst amount is not critical for the polymerization process of this invention but is generally from about 0.05 to about 5.0 mole percent based upon the total monomer being polymerized, more preferably from about 0.5 to about 5.0 mole percent based upon the total monomer being polymerized. The catalyst amount required depends in part upon monomer and diluent purity, since less pure epoxides and diluents require more catalyst to destroy reactive impurities. Therefore, it is preferred generally that impurities such as aldehydes, alcohols, oxygen, water and the like be kept at as low a level as practical in order to decrease catalyst consumption.

The novel process of this invention produces high catalyst efficiency relative to other oxirane polymerization processes, although efficiency may be less than in other arts such as olefin polymerization. The propylene oxide slurry polymerization process of this invention comprises (A) homopolymerizing or copolymerizing propylene oxide in isobutane in the presence of a catalyst described heretofore which is substantially soluble in isobutane, (B) separating isobutane with catalyst dissolved therein from propylene oxide polymer, and (C) recycling isobutane and dissolved catalyst for further polymerization. Recycling may be performed either to the same reaction mixture in a continuous process or to a fresh reaction mixture in a batch process.

Surprisingly and unexpectedly high catalyst efficiencies are attained readily by the process of this invention because catalyst can be recycled. For example, propylene oxide and allyl glycidyl ether may be copolymerized using a trihexylaluminum-containing catalyst at a catalyst efficiency up to 190 grams and more of polymer produced per gram of aluminum in the catalyst. Catalyst efficiency in a single-step polymerization process followed immediately by shortstopping is typically no more than 75 grams polymer per gram of catalyst aluminum. Thus, the catalyst recycling process for propylene oxide-allyl glycidyl ether copolymerization may produce a 150% improvement in catalyst efficiency over the prior art method. Similarly, propylene oxide and epichlorohydrin may be copolymerized using a triethylaluminum-containing catalyst at a catalyst efficiency up to 45 grams and more of polymer produced per gram of aluminum in the catalyst. Catalyst efficiency in a single-step polymerization process followed immediately by shortstopping is typically no more than 35 grams polymer per gram of catalyst aluminum. Thus, the catalyst recycling process for propylene oxide-epichlorohydrin copolymerization may produce at least a 28% improvement in catalyst efficiency over the prior art method.

The catalysts described heretofore may be recycled at 30°C. up to three times and more over a period up to about 1 week and more without losing significant catalytic activity. Other temperatures may also be used, with catalyst life generally varying inversely with temperature.

The polymerization process of this invention may be conducted as a batch or continuous process with the catalyst added all at once, incrementally during the polymerization or continuously throughout the polymerization. Polymerization is conveniently conducted under reflux at autogenous pressures, but superatmospheric pressures up to several hundred pounds or subatmospheric pressures may be used.

Polymer may be separated from the slurry using methods known to the art, such as settling, filtration, centrifugation, pressing or a combination of these methods. The separated polymer may be washed with one or more isobutane portions. The separated polymer may also be washed and shortstopped with water or alcohols such as methanol, ethanol, isopropanol and the like. Mixtures of water and alcohols may also be used. Stabilizers and antioxidants may be included in the alcohol/water wash. The polymer may then be dried, preferably in a vacuum oven at a temperature from about 40°C. to about 75°C. and at about 10 torr.

Additive ingredients known to the art may be blended with the propylene oxide polymers prepared by the recycling process of this invention. Suitable ingredients include antioxidants, stabilizers, crosslinking agents, extenders, fillers, lubricants, pigments and the like.

The following Examples illustrate the present invention more fully.

EXAMPLE 1

Example 1 demonstrates a high catalyst efficiency slurry copolymerization of propylene oxide and allyl glycidyl ether in isobutane. High catalyst efficiency was attained by recycling active catalyst dissolved in the isobutane liquid phase.

A catalyst comprising tri-n-hexylaluminum, diethyl ether, water and acetylacetone was prepared with diethyl ether as solvent. 78 grams tri-n-hexylaluminum and 198 grams diethyl ether were mixed at 0°C. 2.81 grams water was added to the mixture over a 40 minute period at 0°C. Thereafter 18.0 grams acetylacetone was added to the mixture over a 25 minute period at 0°C. The mixture was found to weigh 292 grams. A concentrated catalyst solution was prepared by evaporating the mixture under a nitrogen stream until final mixture weight was 80 grams. Thus, final tri-n-hexylaluminum concentration was 0.975 gram tri-n-hexylaluminum per gram of solution.

About 500 ml (303 g.) isobutane was charged to a $N_2$-blanketed, 1 quart pop bottle. This was followed by capping and addition of about 50 ml (40 g.) of a mixture of about 95% by weight propylene oxide and 5% by weight allyl glycidyl ether. 10.90 grams of concentrated catalyst solution was charged to the reaction vessel, and polymerization began immediately. Polymerization temperature was controlled at about 30°C. by immersion of the reaction vessel in a constant temperature bath. An additional 50.96 grams of the monomer mixture was charged incrementally during polymerization. After about 4.5 hours the liquid isobutane phase containing active catalyst was separated from the polymer by transfer to a separate container and cooled to about −20°C. The first stage polymer was washed with three 70 ml. isobutane portions. Each portion was then mixed with the liquid isobutane phase (mother liquor) containing active catalyst. The polymer was washed once thereafter with the following antioxidant solution:

35 ml isobutane
10 ml methanol
35 ml of a 15 wt. % solution of 2,6-di-t-butyl-
4-methyl phenol in isobutane
―――
80 ml. total The latter wash was discarded after use. Subsequently the polymer was washed twice with 500 ml portions of a methanol/water solution (50 vol. % methanol) and twice with 500 ml water portions. All four washes were discarded. The polymer, a lively white rubber, was dried to constant weight (68.05 g.) in a vacuum oven at about 50° – 60°C. and 10 torr.

The combined mother liquor and three isobutane washes from the first stage was allowed to stand about 24 hours at room temperature. More polymer precipitated during this time and was separated and purified using the same procedure just described except that the 2,6-di-t-butyl-4-methyl phenol solution wash was omitted. The polymer was dried to constant weight (20.28 g.) in a vacuum oven at about 50° – 60°C. and 10 torr. Total first stage polymer yield was 88.33 g.

At the beginning of the second stage polymerization, about 41.57 g. of the monomer mixture was charged to the mother liquor containing active catalyst, and polymerization began immediately. About 24 hours later 24.88 g. more of the monomer mixture was charged, and reaction was allowed to continue. Polymerization temperature varied from about 22°C. to 30°C. After another 72 hours, precipitated polymer was isolated, purified and dried by the same method used for the first stage polymer, including an antioxidant solution wash. Isobutane washes were mixed with the liquid isobutane phase (mother liquor) containing active catalyst. A 65.13 g. yield of lively white rubber was obtained.

At the beginning of the third stage polymerization about 41.39 g. of the monomer mixture was charged to the mother liquor containing active catalyst, and polymerization began immediately. Polymerization temperature varied from about 22°C. to 30°C. Precipitated polymer was collected twice, purified and dried by the same methods used for the first and second stages. Total third stage polymer yield was 38.58 g.

Experimental results are summarized in Table I. Catalyst efficiency was surprisingly high for the three stage process — about 188 grams of polymer per gram of catalyst aluminum.

TABLE I

| Polymerization Number | Monomer Charged (g) | Polymer Yield (g) | Polymer Yield (%) | Cumulative Catalyst Efficiency (g. polymer per g. aluminum in catalyst) |
|---|---|---|---|---|
| 1 | 93.96 | 88.33 | 94.0 | 86 |
| 2 | 66.45 | 65.13 | 95.7 | 150 |
| 3 | 41.39 | 38.58 | 95.3 | 188 |

EXAMPLE 2

Example 2 demonstrates a high catalyst efficiency slurry copolymerization of propylene oxide and allyl glycidyl ether in isobutane. High catalyst efficiency was attained by recycling active catalyst dissolved in the isobutane liquid phase.

A concentrated catalyst solution was prepared by the same procedure described in Example 1. About 500 ml (300 g.) isobutane was charged to a $N_2$-blanketed, 1 quart pop bottle. This was followed by capping and addition of about 50 ml (39 g.) of a mixture of about 95% by weight propylene oxide and 5% by weight allyl glycidyl ether. 10.80 grams of concentrated catalyst solution was charged to the reaction vessel, and polymerization began immediately. Polymerization temperature was controlled by immersion of the reaction vessel in a constant temperature bath at 30°C. An additional 48.51 grams of the monomer mixture was charged incrementally during polymerization. After about 4.5 hours the liquid isobutane phase containing active catalyst was separated from polymer by transfer to a separate container and cooled to about −20°C. The first stage polymer was washed with three 70 ml isobutane portions. Each portion was then mixed with the liquid isobutane phase (mother liquor) containing active catalyst. The polymer was washed three times thereafter with 500 ml portions of a methanol/water solution (50 vol. % methanol) and then with water. The methanol/water and water washes were discarded. The polymer, a lively white rubber, was dried to constant weight (65.38 g.) in a vacuum oven at about 50° − 60°C. and 10 torr.

The combined mother liquor and three isobutane washes from the first stage was allowed to stand about 24 hours at room temperature. More polymer precipitated during this time and was separated and purified using the same procedure just described. The polymer was dried to constant weight (11.56 g.) in a vacuum oven at about 50° − 60°C. and 10 torr. The standing, precipitation, purification and drying was repeated and resulted in isolation of another 3.34 g. of polymer. Total first stage polymer yield was 80.28 g.

Two days after the last first stage precipitation, 41.33 g. of the monomer mixture was charged to the mother liquor containing active catalyst in order to begin a second stage polymerization. 46.27 g. more of the monomer mixture was charged incrementally to the reaction vessel during the next 48 hours. Polymerization temperature was about 30°C. About 24 hours after the last monomer addition, 74.83 g. of precipitated polymer was isolated, purified and dried by the same method used for the first stage polymer. The isolation process was repeated about 72 hours later and yielded about 8.48 g. more of polymer. Total second stage polymer yield was 83.31 g.

At the beginning of the third stage polymerization about 42.34 g. of the monomer mixture was charged to the mother liquor containing active catalyst, and polymerization began immediately. Polymerization temperature varied from about 22°C. to 30°C. Precipitated polymer was collected twice, purified and dried by the same methods used for the first and second stages. Total third stage polymer yield was 31.25 g.

Experimental results are summarized in Table II. Catalyst efficiency was surprisingly high for the three-stage process — about 193 grams of polymer per gram of catalyst aluminum.

attained by recycling active catalyst dissolved in the isobutane liquid phase.

A concentrated catalyst solution was prepared by the same procedure described in Example I. About 500 ml (301 g.) isobutane was charged to a $N_2$-blanketed 1 quart pop bottle. This was followed by capping and addition of about 50 ml (42 g.) of a mixture of about 90% by weight propylene oxide and 10% by weight allyl glycidyl ether. 10.78 grams of concentrated catalyst solution was charged to the reaction vessel, and polymerization began immediately. Polymerization temperature was controlled by immersion of the reaction vessel in a constant temperature bath at 30°C. An additional 53.84 grams of the monomer mixture was charged incrementally during polymerization. After about 4.5 hours, the liquid isobutane phase containing active catalyst was separated from polymer by transfer to a separate container and cooled to about −20°C. The first stage polymer was washed with three 70 ml isobutane portions. Each portion was then mixed with the liquid isobutane phase (mother liquor) containing active catalyst. The polymer was washed once thereafter with the following antioxidant solution:

35 ml isobutane
35 ml of a 15 wt. % solution of 2,6-di-t-butyl-4-methyl phenol in isobutane
---
70 ml total The latter wash was discarded after use. Subsequently the polymer was washed with several portions of a methanol/water solution (50 vol. % methanol) which were discarded later. The polymer, a lively white rubber, was dried to constant weight (52.2 g.) in a vacuum oven at about 50° − 60°C. and 10 torr.

The combined mother liquor and three isobutane washes from the first stage was allowed to stand about 66 hours at room temperature. More polymer precipitated during this time and was separated and purified using the same procedure just described. The polymer was dried to constant weight (16.80 g.) in a vacuum oven at about 50° − 60°C. and 10 torr. Total first stage polymer yield was 69.0 g.

About 42.03 g. of the monomer mixture was charged to the mother liquor containing active catalyst in order to initiate a second stage polymerization. Polymerization was conducted at 30°C. After about 22 hours precipitated polymer was isolated, purified, and dried to

TABLE II

| Polymerization Number | Monomer Charged (g) | Polymer Yield (g) | Polymer Yield (%) | Cumulative Catalyst Efficiency (g. polymer per g. aluminum in catalyst) |
| --- | --- | --- | --- | --- |
| 1 | 87.55 | 80.28 | 91.6 | 79 |
| 2 | 87.60 | 83.31 | 93.0 | 162 |
| 3 | 42.34 | 31.25 | 89.6 | 193 |

EXAMPLE 3

Example 3 demonstrates a high catalyst efficiency slurry copolymerization of propylene oxide and allyl glycidyl ether in isobutane. High catalyst efficiency was constant weight (24.79 g.) by the same method used for stage one. More polymer was collected later, purified and dried to constant weight (14.84 g.) in the same manner. Total second stage polymer yield was 42.63 g.

Polymerization results are summarized in Table III.

TABLE III

| Polymerization Number | Monomer Charged (g) | Polymer Yield (g) | Polymer Yield (%) | Cumulative Catalyst Efficiency (g. polymer per g. aluminum in catalyst) |
| --- | --- | --- | --- | --- |
| 1 | 95.84 | 69.0 | 72 | 65 |
| 2 | 42.03 | 42.63 | 78.8 | 103 |

EXAMPLE 4

Example 4 demonstrates a substantially (about 23%) improved catalyst efficiency produced by slurry copolymerization of propylene oxide and epichlorohydrin in isobutane, followed by recycling active catalyst dissolved in the isobutane liquid phase.

A catalyst comprising triethylaluminum, diethyl ether, water and acetylacetone was prepared with diethyl ether as solvent. 52.5 grams triethylaluminum and 337 grams diethyl ether were mixed at 0°C. 4.60 grams water was added to the mixture over a 70 minute period at 0°C. Thereafter 30.4 grams acetylacetone was added to the mixture over a 50 minute period at 0°C. A concentrated catalyst solution was prepared by evaporating the mixture under a nitrogen stream until final mixture weight was 105.5 grams. Thus, final triethylaluminum concentration was 0.498 gram triethylaluminum per gram of solution.

About 500 ml (288 g.) isobutane was charged to an $N_2$-blanketed, crown-capped 1 quart pop bottle. This was followed by capping and addition of about 50 ml (44 g.) of a mixture of about 85% by weight propylene oxide and 15% by weight epichlorohydrin. 17.93 grams of concentrated catalyst solution was charged to the reaction vessel, and polymerization began immediately. Polymerization temperature was maintained at about 30°C. by immersion of the reaction vessel in a constant temperature bath. An additional 56.86 grams of the monomer mixture was charged incrementally during polymerization. After about 2 hours the liquid isobutane phase containing active catalyst was transferred to another reaction vessel and cooled below −11°C. The first stage polymer was washed with two 70 ml isobutane portions. Each portion was then mixed with the liquid isobutane phase (mother liquor) containing active catalyst. The polymer was washed several times with methanol/water solutions (50 vol. % methanol) and the washes discarded. The polymer, a lively rubber, was dried to constant weight (53.10 g.) in a vacuum oven at about 40° – 60°C. and 10 torr.

The combined mother liquor and two isobutane washes from the first stage was allowed to stand about 72 hours at room temperature. More polymer precipitated during this time and was separated and washed with 70 ml of isobutane. The isobutane was mixed with the mother liquor. The polymer was washed several times with methanol/water solutions (50 vol. % methanol) and the washes discarded. The polymer was dried to constant weight (21.90 g.) in a vacuum oven at about 40° – 60°C. and 10 torr. Total first stage polymer yield was 75.00 g.

About 44.0 g. of the monomer mixture was charged to the mother liquor containing active catalyst in order to initiate a second stage polymerization. Polymerization was conducted at 30°C. and after about 48 hours another 17.6 g. of the monomer mixture was charged to the mother liquor. About 24 hours later precipitated polymer was collected, washed with isobutane and a methanol/water mixture (50 vol. % methanol) and dried to constant weight (19.28 g.) as before.

Experimental results are summarized in Table IV.

TABLE IV

| Polymerization Number | Monomer Charged (g) | Polymer Yield (g) | Polymer Yield (%) | Cumulative Catalyst Efficiency (g. polymer per g. aluminum in catalyst) |
| --- | --- | --- | --- | --- |
| 1 | 100.86 | 75.00 | 74.3 | 35.1 |
| 2 | 61.6 | 19.28 | 31.2 | 44.3 |

Propylene oxide homopolymers and copolymers with other oxirane monomers are well known to the art. For example, copolymers of propylene oxide and allyl glycidyl ether have good tensile and tear strength, excellent low temperature flexibility and ozone and weather resistance. These copolymers also exhibit low swell in water, ethanol, ethylene glycol and the like and have rebound and heat build-up properties comparable to natural rubber. This wide range of desirable properties makes copolymers of propylene oxide and allyl glycidyl ether useful for automobile motor and body mounts, windshield wiper blades, coolant system hoses, gaskets, seals, grommets, diaphragms and the like. Copolymers of propylene oxide and epichlorohydrin have similar properties and have improved oil resistance with increasing epichlorohydrin content. Polypropylene oxide may be peroxide-cured as is known to the man skilled in the art in order to make a variety of useful elastomeric products.

I claim:

1. A slurry polymerization process comprising (A) polymerizing propylene oxide and up to about 40% by weight of the total monomer mixture of at least one other oxirane monomer, polymerization being conducted in isobutane in the presence of a catalyst substantially soluble in isobutane, (B) separating isobutane with catalyst dissolved therein from polymer, and (C) recycling isobutane and dissolved catalyst for further polymerization, said catalyst comprising (1) at least one trialkylaluminum compound wherein each alkyl group contains from 2 to 10 carbon atoms, (2) at least one diketone containing from 5 to 20 carbon atoms in an amount from about 0.3 mole to 1 mole per mole of said trialkylaluminum compound, and (3) water in an amount from about 0.3 mole to about 1 mole per mole of said trialkylaluminum compound.

2. A process of claim 1 wherein said catalyst contains at least one dialkyl ether or cycloalkyl ether containing from 2 to 12 carbon atoms in an amount from about 0.5 mole to about 25 moles per mole of said trialkylaluminum compound.

3. A process of claim 2 wherein said other oxirane monomer is present in an amount up to 25% by weight of the total monomer mixture and is selected from the group consisting of (a) glycidyl ethers and haloalkyl glycidyl ethers, (b) alkylene oxides and cycloalkylene oxides, (c) haloalkylene oxides, (e) glycidyl acrylate and glycidyl methacrylate and (f) phenyl alkylene oxides.

4. A process of claim 3 wherein said other oxirane monomer is selected from the group consisting of (a) glycidyl ethers and haloalkyl glycidyl ethers containing from 4 to 15 carbon atoms, (b) alkylene oxides and cycloalkylene oxides containing from 2 to 8 carbon atoms, (c) epihalohydrins.

5. A process of claim 4, wherein said other oxirane monomer is allyl glycidyl ether or epichlorohydrin.

6. A process of claim 5 wherein said trialkylaluminum compound is trihexylaluminum.

7. A process of claim 6 wherein said dialkyl ether is diethyl ether, said diketone is acetylacetone, and said other oxirane monomer is allyl glycidyl ether.

8. A process of claim 5 wherein said trialkylaluminum compound is triethylaluminum, said dialkyl ether is diethyl ether, said diketone is acetylacetone, and said other oxirane monomer is epichlorohydrin.

9. A process of claim 1 wherein said catalyst contains at least one ether alcohol containing from 2 to 12 carbon atoms in an amount from about 0.05 mole to about 0.5 mole per mole of said trialkylaluminum compound.

10. A process of claim 2 wherein said catalyst contains at least one ether alcohol containing from 2 to 12 carbon atoms in an amount from about 0.05 mole to about 0.5 mole per mole of said trialkylaluminum compound.

11. A process of claim 1 wherein said catalyst contains aluminum tris(acetylacetonate) in partial or total molar replacement of said diketone and in partial molar replacement of up to 1/3 mole of said trialkylaluminum compound, one mole of said aluminum tris(acetylacetonate) being equivalent to three moles of said diketone.

12. A process of claim 2 wherein said catalyst contains aluminum tris(acetylacetonate) in partial or total molar replacement of said diketone and in partial molar replacement of up to 1/3 mole of said trialkylaluminum compound, one mole of said aluminum tris(acetylacetonate) being equivalent to three moles of said diketone.

* * * * *